(12) United States Patent
Bilteryst et al.

(10) Patent No.: US 11,075,551 B2
(45) Date of Patent: Jul. 27, 2021

(54) METHOD FOR MAKING STATOR OF ROTARY ELECTRICAL MACHINE

(71) Applicant: VALEO EQUIPEMENTS ELECTRIQUES MOTEUR, Creteil (FR)

(72) Inventors: Pierre-Yves Bilteryst, Brimeux (FR); Henri Delianne, Maresville (FR); David Margueritte, Wailly Beaucamp (FR); Eric Jozefowiez, Le Parcq (FR); Sylvain Perreaut, Vieille-Eglise (FR); Patrice Balthaze, Sevres (FR); Julien Battut, Lille (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 16/518,074

(22) Filed: Jul. 22, 2019

(65) Prior Publication Data

US 2019/0393742 A1     Dec. 26, 2019

Related U.S. Application Data

(62) Division of application No. 15/347,021, filed on Nov. 9, 2016, now abandoned.

(30) Foreign Application Priority Data

Nov. 9, 2015 (FR) ...................................... 1560709

(51) Int. Cl.
*H02K 1/16* (2006.01)
*H02K 15/00* (2006.01)
(Continued)

(52) U.S. Cl.
CPC .............. *H02K 1/165* (2013.01); *H02K 3/48* (2013.01); *H02K 3/487* (2013.01); *H02K 15/0018* (2013.01); *H02K 15/0031* (2013.01)

(58) Field of Classification Search
CPC ........... H02K 15/0018; H02K 15/0031; H02K 1/165; H02K 3/48; H02K 3/487
See application file for complete search history.

(56) References Cited

U.S. PATENT DOCUMENTS

| 5,369,877 A | 12/1994 | Lombardi et al. |
|---|---|---|
| 6,002,219 A | 12/1999 | Permuy |

(Continued)

FOREIGN PATENT DOCUMENTS

| CN | 101375484 A | 2/2009 |
|---|---|---|
| EP | 1463184 A2 | 9/2004 |

(Continued)

OTHER PUBLICATIONS

Oguchi (JP 2009005543 A) English Translation (Year: 2009).

*Primary Examiner* — Minh N Trinh
(74) *Attorney, Agent, or Firm* — Berenato & White, LLC

(57) ABSTRACT

A stator of a rotary electrical machine has a stator body formed by a stack of metal sheets. The stator body is delimited by inner and outer radial surfaces. Notches in the stator body extend axially. Each notch has a notch base and a notch opening, and the notch opening is on the side of the inner radial surface. A stator winding is supported by the stator body, and the winding has a plurality of winding parts. Each part is accommodated in one of the notches. Each of the notches at the notch opening has a closure element. Each winding par in a notch is retained between the notch base and the closure element. The closure elements are formed by offsetting at least one of the metal sheets of an adjacent notch in the direction of the notch.

19 Claims, 11 Drawing Sheets

(51) Int. Cl.
*H02K 3/48* (2006.01)
*H02K 3/487* (2006.01)

(56) References Cited

U.S. PATENT DOCUMENTS

| | | | |
|---|---|---|---|
| 6,018,517 A | 1/2000 | Bengio et al. | |
| 7,081,697 B2* | 7/2006 | Neet | H02K 1/165 |
| | | | 310/201 |
| 7,808,148 B2 | 10/2010 | Neet | |
| 8,102,092 B2 | 1/2012 | Tomohara et al. | |
| 10,505,409 B2* | 12/2019 | Darras | H02K 15/10 |
| 10,840,749 B2* | 11/2020 | Chaillou | H02K 15/10 |
| 2002/0163272 A1* | 11/2002 | Larsson | H02K 3/12 |
| | | | 310/180 |
| 2010/0013347 A1* | 1/2010 | Clark | H02K 1/165 |
| | | | 310/216.069 |
| 2011/0140562 A1* | 6/2011 | Kato | H02K 21/14 |
| | | | 310/156.57 |
| 2012/0019096 A1 | 1/2012 | Taniguchi et al. | |
| 2012/0084958 A1 | 4/2012 | Duret | |
| 2015/0001984 A1* | 1/2015 | Bradfield | H02K 15/0018 |
| | | | 310/216.069 |
| 2017/0133893 A1 | 5/2017 | Bilteryst et al. | |
| 2019/0393742 A1* | 12/2019 | Bilteryst | H02K 15/0018 |

FOREIGN PATENT DOCUMENTS

| | | |
|---|---|---|
| FR | 2708157 A1 | 1/1995 |
| FR | 2708398 A1 | 2/1995 |
| FR | 2710197 A1 | 3/1995 |
| FR | 2745445 B1 | 5/1998 |
| FR | 2900773 A1 | 11/2007 |
| JP | 2001119869 A | 4/2001 |
| JP | 2001309582 A | 11/2001 |
| JP | 2005137083 A | 5/2005 |
| JP | 2009005543 A | 1/2009 |

* cited by examiner

METHOD FOR MAKING STATOR OF ROTARY ELECTRICAL MACHINE

CROSS-REFERENCE TO RELATED APPLICATIONS AND CLAIM TO PRIORITY

This application is related to patent application Ser. No. 1560709 filed Nov. 9, 2015 in France, the disclosure of which is incorporated herein by reference and to which priority is claimed. This application is a divisional of U.S. application Ser. No. 15/347,021, filed Nov. 9, 2016, now abandoned, the entire disclosure of which is incorporated herein by reference and to which priority is claimed.

FIELD OF THE INVENTION

The present invention relates to a rotary electrical machine, and more particularly to the stator of a rotary electrical machine of this type.

BACKGROUND OF THE INVENTION

Use of rotary electrical machines in motor vehicles is known. These can consist of a compact polyphase alternator. This alternator transforms mechanical energy into electrical energy, and can be reversible. A reversible alternator of this type is known as an alternator-starter, and in another functioning mode transforms electrical energy into mechanical energy, in particular in order to start the thermal engine of the vehicle.

This machine substantially comprises a housing 1, and, inside the latter, a claw rotor 2 which is integral in rotation with a shaft 3, and a stator body 4 which surrounds the rotor with the presence of a small air gap, and comprises a body in the form of a set of plates provided with notches, in this case of the semi-closed type, equipped with notch insulators for fitting of the phases of the stator, and each comprising at least one winding forming a chignon 5 on both sides of the stator body. The windings are obtained for example from a continuous wire covered with enamel, or from conductive elements in the form of a bar, such as pins which are connected to one another for example by welding.

These windings are for example three-phase windings connected in the form of a star or a triangle, the outputs of which are connected to at least one rectifier bridge comprising rectifier elements such as diodes or transistors of the MOSFET type, in particular when an alternator-starter is involved, as described for example in document FR A 2 745 445 (U.S. Pat. No. 6,002,219).

The number of phases depends on the applications, and can be more than three, with one or two rectifier bridges being able to be provided.

The claw rotor 2 comprises two axially juxtaposed magnet wheels 7, 8 with an annular form, each having a transverse flange which is provided on its outer periphery, with teeth 9 with a trapezoidal form, facing axially towards the flange of the other magnet wheel, with the tooth of one magnet wheel penetrating into the space which exists between two adjacent teeth 9 of the other magnet wheel, such that the teeth of the magnet wheels are imbricated. The flanges of the wheels 7, 8 have an annular form, and have on their outer periphery radial projections (with no reference) which are connected by chamfers to the teeth 9. These projections form claws together with the teeth 9. The number of teeth 9 depends on the applications, and in particular on the number of phases of the stator. For example eight teeth per magnet wheel can be provided. As a variant, each magnet wheel comprises six or seven teeth.

A cylindrical core is interposed axially between the flanges of the wheels 7, 8. In this case, this core consists of two half-cores, each belonging to one of the flanges. This core supports an excitation winding 10 on its outer periphery. An insulator, such as a winding 10 support coil, is interposed radially between the core and the winding 10.

The shaft 3 of the rotor 2 supports on its front end a drive unit such as a pulley 12 belonging to a movement transmission device with at least one belt between the alternator and the thermal engine of the motor vehicle, and which, at its rear end 13, with a reduced diameter, has collector rings which are connected by wired connections to the ends of the excitation winding of the rotor. In this case, the wired connections and the collector rings belong to an added-on collector of the type described in document FR 2 710 197. Brushes belong to a brush-holder 14, and are arranged such as to rub on the collector rings. The brush-holder is connected to a voltage regulator. The front and rear ends of the shaft 3 thus each comprise a plurality of sections.

When the excitation winding 10 is supplied electrically by the brushes, the rotor 2, which is made of ferromagnetic material, is magnetised, and becomes an inductor rotor with formation of magnetic poles at the teeth of the magnet wheels.

This inductor rotor 10 creates an induced alternating current in the induced stator when the shaft 3 turns, with the rectifier bridge(s) making it possible to transform the induced alternating current into a direct current, in particular in order to supply the loads and consumers of the on-board network of the motor vehicle, as well as to recharge the battery of the said vehicle.

In its interior, on its outer periphery, the housing 1 supports the stator body 4, and centrally, such as to rotate, the shaft 3. In this case, this housing is in two parts, i.e. a front bearing 16 adjacent to the pulley 12, and a rear bearing 17 which supports the brush-holder, the voltage regulator, and at least one rectifier bridge. The bearings have a hollow form, and each comprise centrally a ball bearing respectively 19 and 20, for fitting with rotation of the shaft 3 of the rotor 2. The diameter of the bearing 19 is greater than that of the bearing 20.

In FIG. 1, on the outer periphery of the stator body 4, a resilient system is provided in order to filter the vibrations, with a flat joint 48 at the front, and buffers 49 at the rear, with flexible and thermally conductive resin being interposed between the front bearing and the stator body, in order to discharge the heat. As a variant, the bearings 16, 17 support the stator body 4 rigidly.

In FIG. 1, the bearings are perforated in order to permit the cooling of the alternator by circulation of air. For this purpose, the rotor 2 supports, at one of its axial ends at least, a fan which is designed to ensure this circulation of the air. In the example represented, a fan 23 is provided on the front frontal face of the rotor, and another, more powerful fan 24 is provided on the rear dorsal face of the rotor, each fan being provided with a plurality of blades 25, 26.

In these machines two problems in particular arise on the winding 5 of the stator body 4. Firstly, the winding is not well compacted, and occupies more space in the notch than it could occupy if it were compacted. This is detrimental, since, for a given total length of wire, the addition of copper in the notches makes it possible to increase the performance, and in particular the output of the machine. Secondly, the winding is not well secured in the notches, and can project from the inner diameter of the stator, which gives rise to a risk of collision with the rotor in rotation.

The solutions proposed according to the prior art do not make it possible to solve this problem satisfactorily.

Thus, it is known from patent U.S. Pat. No. 7,808,148 to crush the wire radially in order to increase its orthoradial width, so that it is supported on the edges of the notch. In this case, the wire, and in particular its insulator, are liable to be damaged during this operation.

It is known from patent FR2900773 to apply radial compression on the wires of a notch in order to increase their orthoradial distance. In this case, this method is applied specifically to the notches with two columns of wires. It does not propose a solution in particular for notches with wires aligned according to a single column.

Finally, it is known from patent FR2708398 to crush the wires radially on the outer surface of the rotor. This solution cannot be applied as such to the stator notches, since in this prior art, the objective is to retain the wire in the rotor notches.

There is therefore a need for a solution which makes it possible both to retain the wire in the notches, and to compact it in a reproducible manner and without reduction of the performance of the electrical machine. This need is all the more pressing in the case of stators which have notches without tooth roots.

SUMMARY OF THE INVENTION

The objective of the invention is to fulfil this requirement whilst eliminating at least one of the aforementioned disadvantages.

According to the invention, a stator of a rotary electrical machine is proposed comprising:
- a stator body formed by a stack of metal sheets, the said stator body being provided with an axis and being delimited by an inner radial surface and an outer radial surface;
- notches provided in the said stator body, each extending axially, each of them having a notch base and a notch opening, the said notch opening being situated on the side of the said inner radial surface;
- a stator winding supported by the said stator body, the said winding comprising a plurality of winding parts, each of them being accommodated in one of the said notches.

According to a general characteristic of the invention, each of the notches is provided at the notch opening with at least one notch closure element, such that the winding part which is accommodated in the said notch is retained between the notch base and the said closure element, and, for each of the notches, the closure element is formed by offsetting of at least one of the metal sheets of an adjacent notch, in the direction of the said notch.

This permits the simple and rapid formation of the closure elements, without damaging the wire, and without reducing the performance of the electrical machine. For example, the closure element can be formed on a stator without a tooth root. It then acts as a tooth root. The notch closure element can also be formed on a stator already provided with tooth roots.

According to other characteristics taken in isolation or in combination:
- the offsetting is circumferential offsetting;
- one notch out of two comprises a number N of closure elements, N being a whole number equal to 2 or more, and the remaining notches comprising a number of closure elements strictly smaller than N, for example N−1. This makes it possible to obtain an optimum number of closure elements. It is not compulsory to have the same number for each notch;
- two notches with a number N of closure elements are adjacent to both sides of a notch with a smaller number of closure elements. This arrangement is advantageous, since it makes it possible to have a set of tools positioned facing two notches, followed by rotation by an angle corresponding to two notches of the set of tools relative to the stator;
- with the notches being numbered according to the circumference of the stator, the notches with an even number comprise a number of closure elements different from that of the notches with an odd number. Thus, there is alternation of the number of closure elements, in addition to the possibility previously described of having a set of tools. This also permits good distribution of the closure elements;
- the closure elements of the notches are distributed axially along the axial length of the stator body. This makes it possible to have good distribution of the closure elements, but this time axially, in particular in order to reduce the stresses on the wires.
- at least one of the closure elements of a notch with a smaller number of closure elements is situated on a radial plane which passes via the middle of two adjacent closure elements of a notch comprising the N closure elements. Thus, as well as permitting ideal distribution of the closure elements, there is avoidance of the phenomenon of interference corresponding to deformation to the right and to the left at the same axial level of a single tooth;
- for a given notch, with the closure elements of this notch being situated respectively on first radial planes of the stator body, and the closure elements of the adjacent notch being situated respectively on second radial planes of the stator body, the first radial planes are different from the second radial planes. This therefore avoids the aforementioned phenomenon of interference;
- the first radial planes and the second radial planes are spaced axially by a distance equal to at least two metal sheets. An axial distance is defined between the two closure elements, in order to avoid the problem of interference;
- the closure element is formed firstly by the offsetting of at least one of the metal sheets of an adjacent notch to the fight in the direction of the said notch, and secondly by offsetting of at least one of the metal sheets of an adjacent notch to the left in the direction of the said notch, the two offsettings being situated on the same radial plane. With a notch having a closure element comprising two offsettings situated on the same radial plane, the offsetting necessary is smaller, and there is therefore reduction of the forces applied to the tool in order to deform the notches;
- a closure element is formed by offsetting of at least two contiguous metal sheets, such that the closure element has an axial height of at least two metal sheets. This therefore defines an axial length of the closure element;
- the two starting notch edges for each notch of the notch base towards the notch opening are each contained on a straight line before the formation of the notch closure element. Although the invention is advantageous for notches which are provided with tooth roots, since it permits better retention there of the winding part, and thus reduction or even elimination of the notch closure wedge, the needs are even more pressing in the case when the notches are not provided with tooth roots;

for each closure element of a notch, at least one of the two adjacent notches has traces of deformation by radial introduction of a tool with an orthoradial dimension greater than the notch width. This tool permits orthoradial deformation simply by means of its radial translation;

for each closure element of the notch, at least one of the two adjacent notches has traces of deformation by radial introduction of a tool with a substantially spherical form. It thus has the advantage of having an orthoradial width which increases progressively for progressive offsetting of the metal sheets. It also has a capacity for self-centring within the notch opening, such that the offsettings towards the adjacent notch to the right and to the left will be balanced, or even equal. Finally, this rounded form makes it possible to avoid damaging the wire when the tool is used to compact the winding part;

for each closure element of a notch, at least one of the two adjacent notches has traces of deformation by radial introduction of a tool in the form of a triangular prism with rounded ridges;

the winding part of a notch has traces of compacting by the said radial introduction of a tool. The compacting action can easily be added to the formation of the notch closure elements. This is due in particular to the radial introduction of the tool into the notch;

the winding part of a notch comprises a plurality of wires aligned according to a column, for example a single column;

the winding part of a notch comprises a plurality of wires aligned according to two parallel columns. For example, the wires are aligned according to two columns as far as the last but one row starting from the base of the notch, with the final row being occupied by a single wire;

the number of closure elements is identical for each of the notches.

The invention also relates to a machine comprising a stator as previously described.

The subject of the invention is also a method for formation of the stator, the said stator comprising:

a stator body formed by a stack of metal sheets, the said stator body being provided with an axis and being delimited by an inner radial surface and an outer radial surface;

notches provided in the said stator body, and extending axially, each of them having a notch base and a notch opening, the said notch opening being situated on the side of the said inner radial surface;

a stator winding supported by the said stator body, the said winding comprising a plurality of winding parts, each of them being accommodated in one of the said notches.

According to a general characteristic of the invention, the method comprises a step of closure at the notch opening, so that the winding part which is accommodated in the said notch is retained between the notch base and the said closure element, and the closure step comprises a step of offsetting of at least one of the metal sheets of an adjacent notch in the direction of the said notch. For example, the closure step can be carried out on a stator without a tooth root. This therefore makes it possible to form a tooth root. The notch closure step can also be carried out on a stator already provided with tooth roots.

According to other characteristics taken in isolation or in combination:

the closure step comprises for each notch:
firstly a step of offsetting of at least one of the metal sheets of an adjacent notch to the right in the direction of the said notch;
secondly a step of offsetting of at least one of the metal sheets of an adjacent notch to the left in the direction of the said notch, the two offsetting steps being carried out on the same radial plane;

the offsetting step is carried out on an axial eight of at least two metal sheets;

the said offsetting step comprising a step of introduction of a tool according to a radial direction, the said tool having an orthoradial dimension greater than the notch width;

the said offsetting step comprising a step of introduction of a tool according to a radial direction, the said tool having a substantially spherical form;

during the said offsetting step, compacting is carried out of the winding part accommodated in the notch into which the tool is introduced according to a radial direction;

for a notch comprising a plurality of closure elements distributed axially, during the offsetting step, a single tool provided with a plurality of tools distributed axially is introduced radially into at least one notch adjacent to the said notch.

BRIEF DESCRIPTION OF THE DRAWINGS

The invention will be better understood by reading the following description and examining the figures which accompany it. These figures are provided purely by way of illustration of the invention which is in no way limiting.

Elements which are identical, similar or analogous retain the same reference from one figure to another.

DETAILED DESCRIPTION OF THE PREFERRED EMBODIMENT(S)

Figure 1:
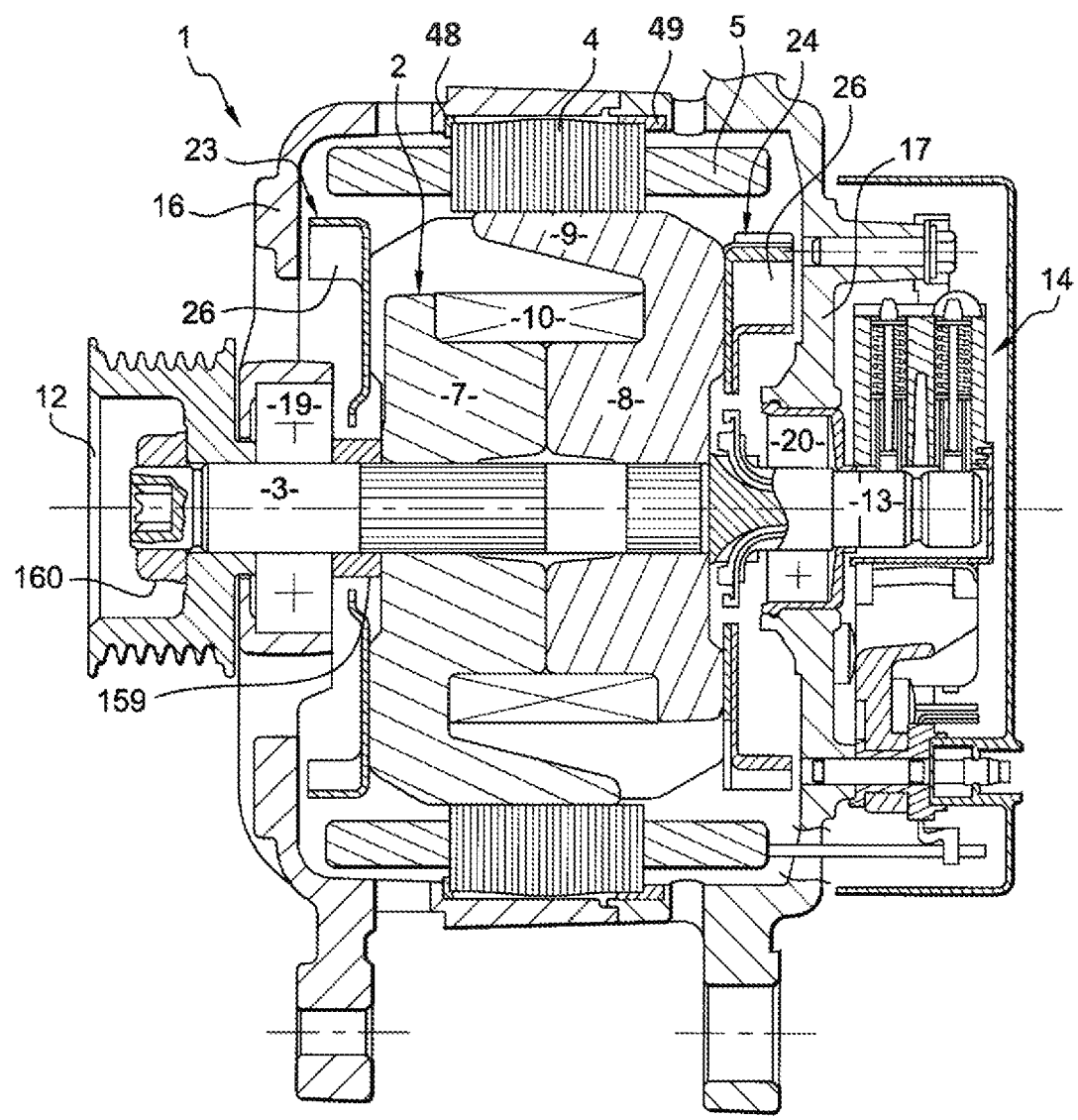
FIG. 1, already described, is a view of a rotary electrical machine.
Figure 2:
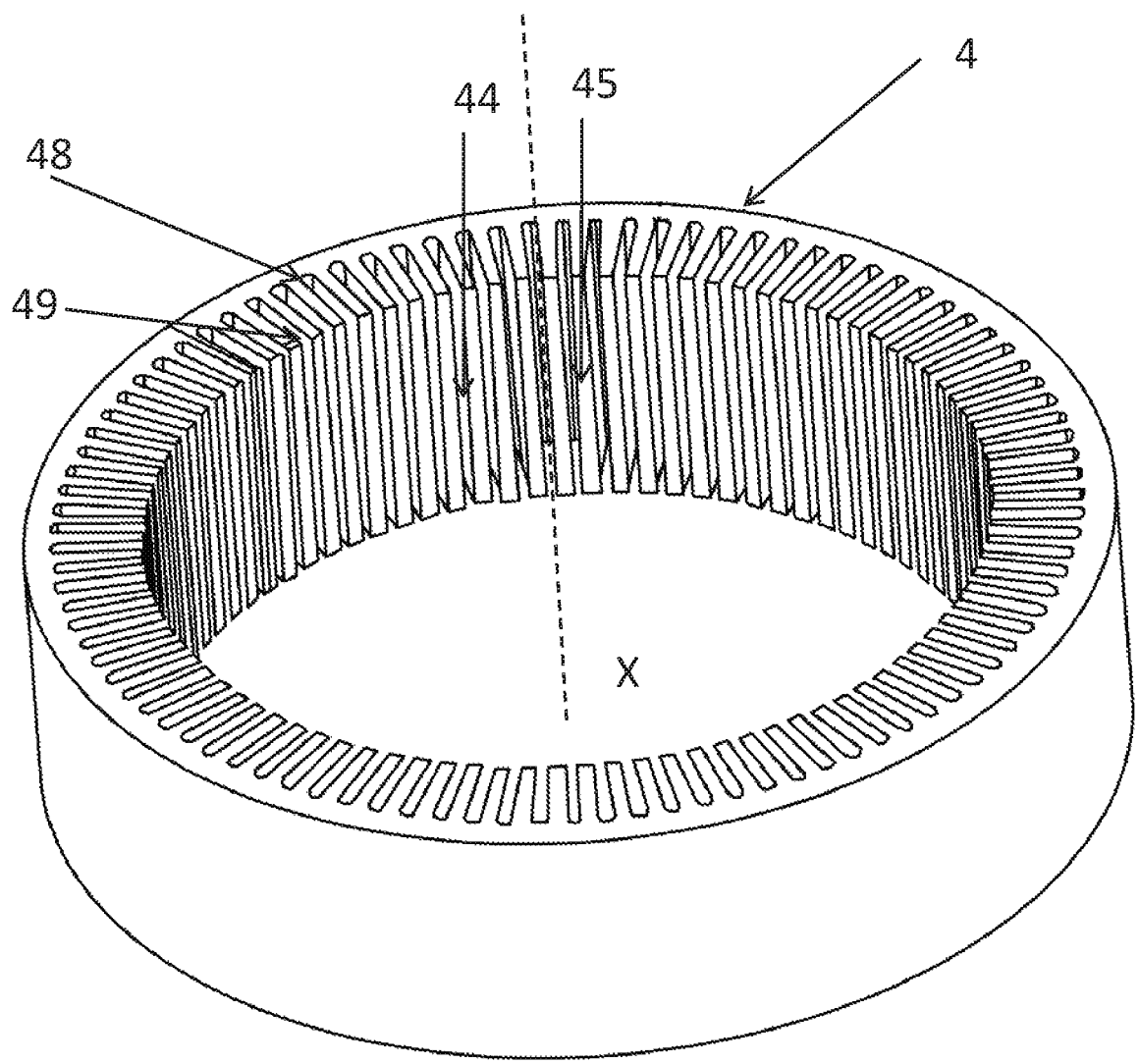
FIG. 2 represents a view in perspective of a stator body of a rotary electrical machine in the form of an alternator.

FIG. 2 illustrates a stator body 4 for a rotary electrical machine. The stator body 4 is formed by a stack of metal sheets geometrically identical in a circumferential (i.e., angular) direction. The stator body 4 has an axis X and is delimited by an inner radial surface and an outer radial surface. Notches 44 are provided in the stator body. These notches 44 extend axially, two notches 44 being separated by a tooth 45. Each of the notches 44 has a notch base 48 and a notch opening 49. The notch opening 49 is situated on an inner radial surface side of the stator body 4. For each notch, a radial notch depth is defined between the notch opening and the notch base.

Figure 3:
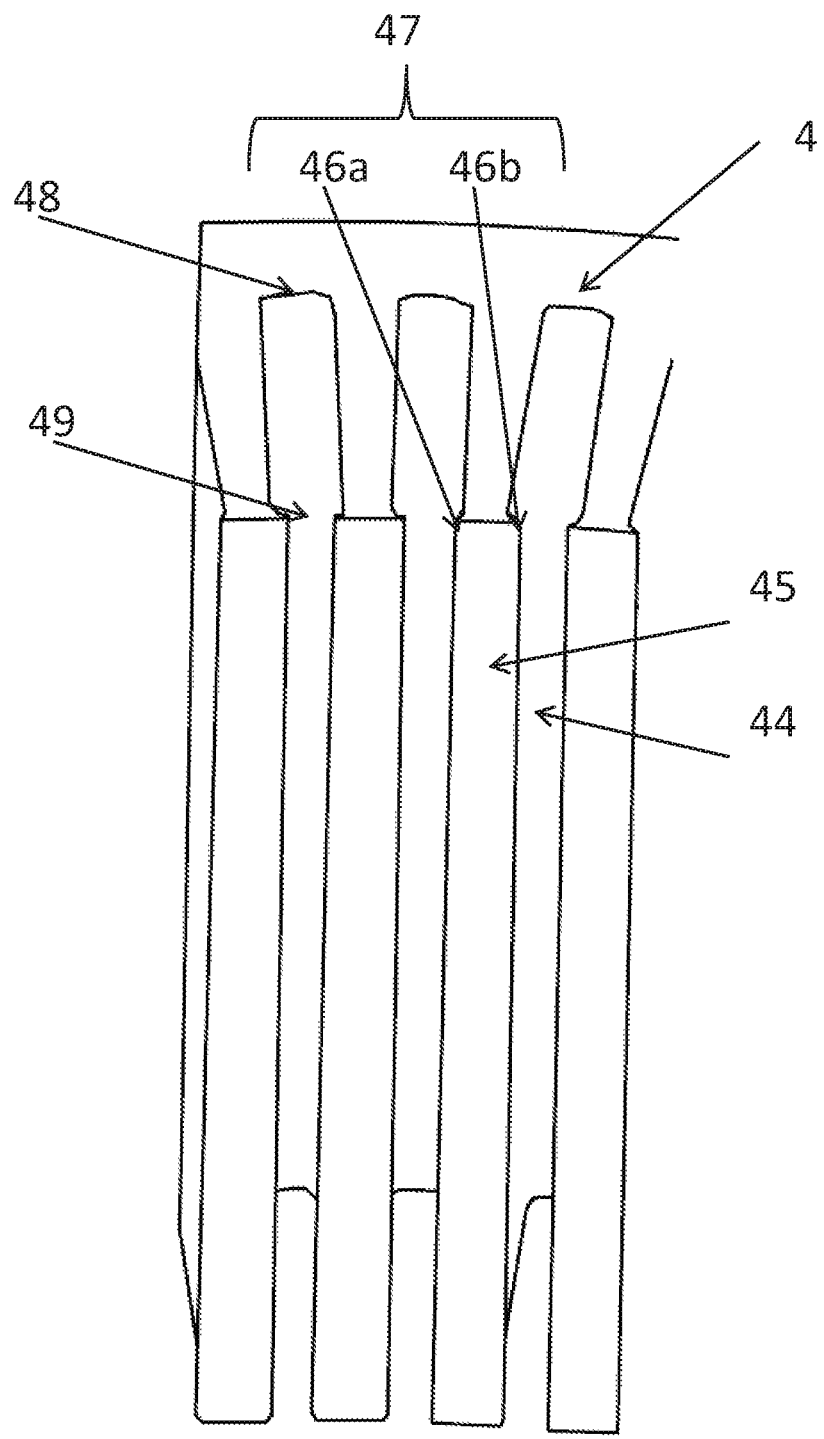
FIG. 3 is a view of a detail of a stator body according to another embodiment of the invention.

FIG. 3 illustrates a stator body 4 for a rotary electrical machine according to another embodiment of the invention. This embodiment differs from the one in FIG. 2 by the presence of a tooth root 47 on each of the teeth 45. The tooth root 47 is formed by two projections with an orthoradial direction, one to the left 46a, and another to the right 46b.

Figure 4:
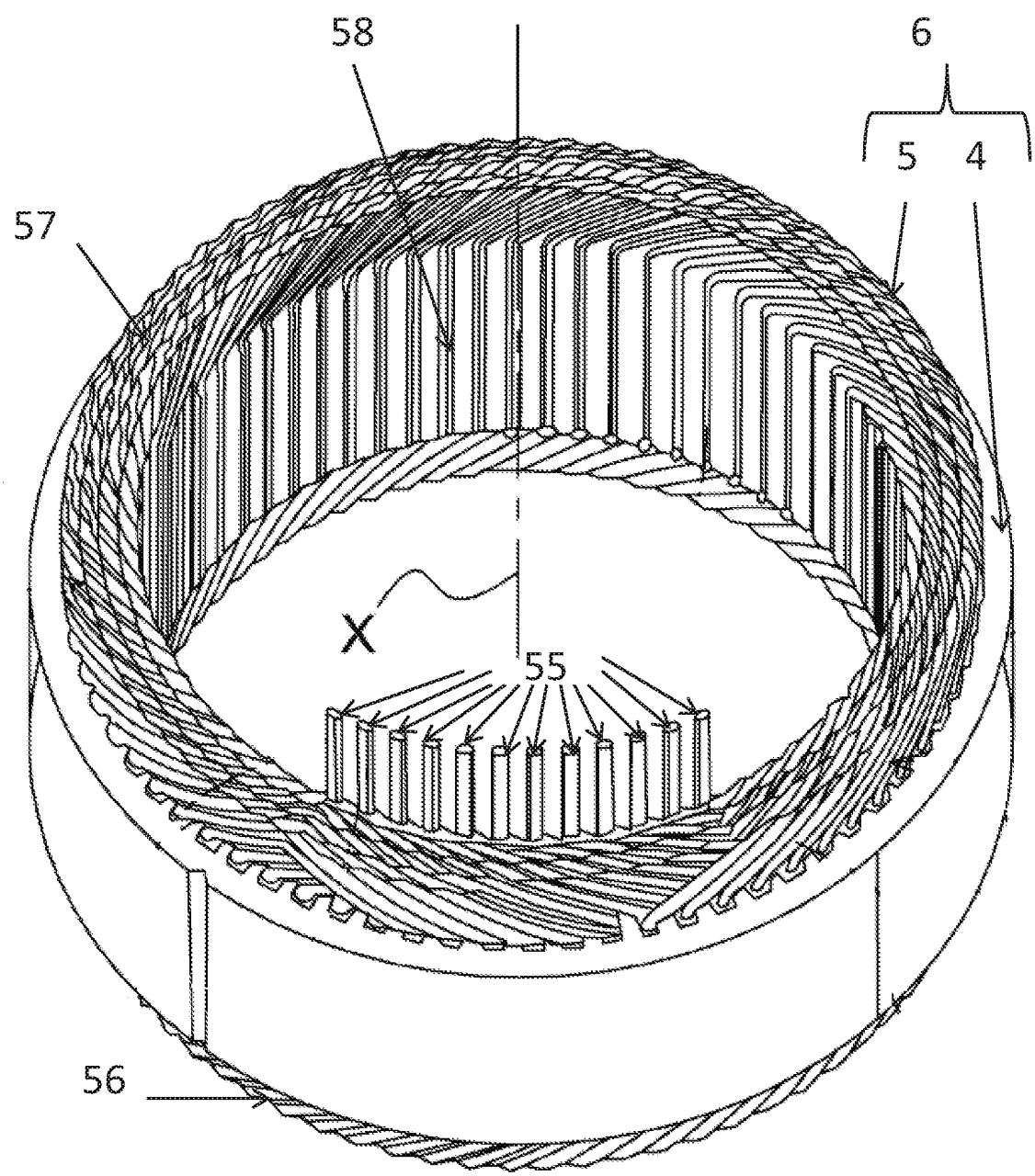
FIG. 4 is a view in perspective of a stator according to the invention comprising a stator body and a winding.

FIG. 4 illustrates a stator body 4 supporting a winding 5. The stator body 4 and the winding form a stator 6 of a rotary electrical machine. In other words, the electrical machine stator 6 comprises a stator body 4 provided with notches 44 and a winding 5. The winding 5 comprises a plurality of winding parts 58, each of them being accommodated in one of the said notches 44. The winding comprises two chignons 56 and 57 situated axially on both sides of the stator body. The winding parts 58 connect the chignons 56 and 57. The winding additionally comprises inputs and outputs 55 which project axially relative to the chignon 57.

Figure 5:
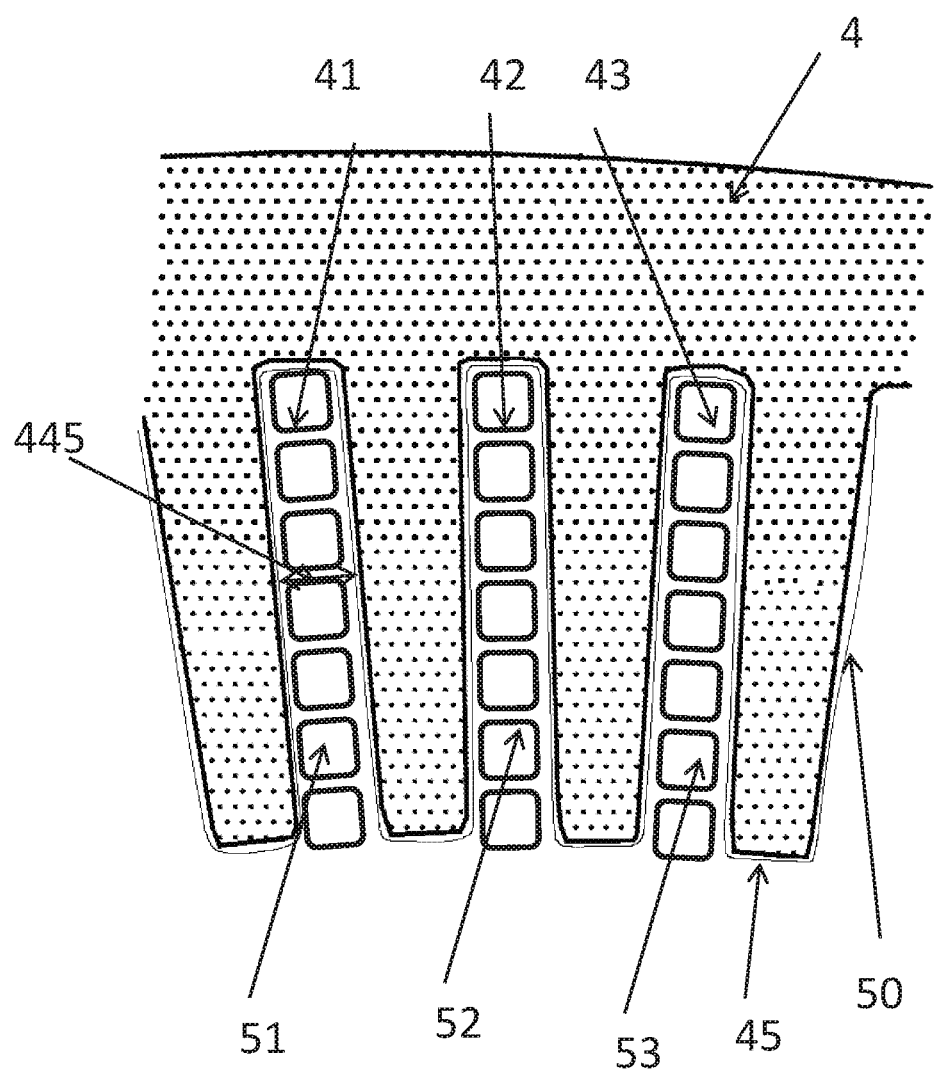
FIGS. 5, 6, 7, 8 and 9 are views according to a radial cross-section of the stator according to FIG. 4.

FIG. 5 illustrates a detail of the stator 6 in FIG. 4. More specifically, it is a cross-section according to a radial plane, which is used synonymously with being perpendicular to the axis X in the continuation of the description. This figure illustrates three notches 41, 42 and 43, which receive respectively the winding parts 51, 52 and 53. The notches 41, 42 and 43 are separated by the teeth 45. The teeth and the notches are covered with an insulating paper 50, also known as the insulator. This insulator is necessary in order to ensure electrical insulation between the winding parts 51, 52 and 53 and the stator body 4. In fact, during the functioning of the electrical machine, a current passes through the winding parts, whereas the body is at the potential of the electrical earth. The thickness of the insulator is approximately a $10^{th}$ of a millimeter. As can be seen in FIG. 5, the winding parts 51, 52 and 53 comprise for example 7 wires per notch aligned according to a radial column. The winding parts are not compacted, such that the last wire on the notch opening side extends from the inner radial surface of the stator body. For each notch, there is definition of a notch width 445 which corresponds to the distance according to an orthoradial direction between the two edges of the notch. For each notch, there is also definition of an insertion width corresponding to the orthoradial distance between the two edges of the notch when they are covered with the insulating paper 50. On the stator in FIG. 5, it can be seen that the wires are not retained at the level of the notch opening, and have a diameter smaller than the insertion width. There is therefore a risk that the last wire on the notch opening side will exit completely from the notch 44. For the embodiment in FIG. 5, the two starting notch edges for each notch of the notch base towards the notch opening are contained respectively on a straight line before the formation of a notch closure element. However, the invention also applies to the stator illustrated in FIG. 2, according to which each tooth is provided with tooth roots.

Figure 6:
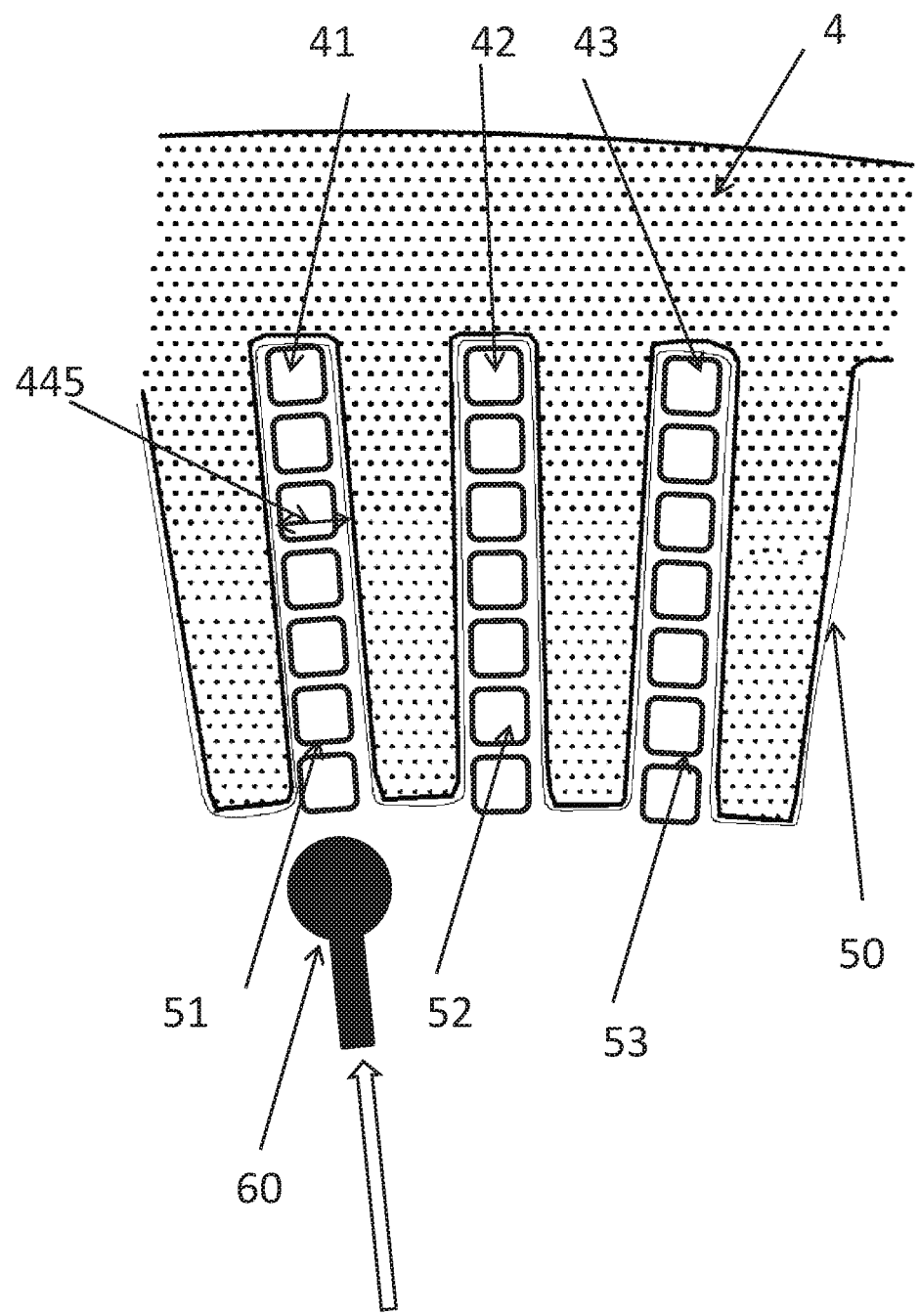

FIG. 6 illustrates the arrival of a tool 60 at the notch 41, the action of which tool eliminates the aforementioned risk. The tool is displaced by translation according to a radius aligned with the notch 41, and for example on a first radial plane perpendicular to the axis X. In other words, the tool is displaced radially relative to the notch into which it must be introduced. The tool illustrated in FIG. 6 has a spherical form, and has the advantage of not damaging the wire, and having a progressive orthoradial width which permits centring of the tool in the notch opening. However, any form of tool is appropriate, provided that it has a diameter greater than the notch width 445.

Figure 7:
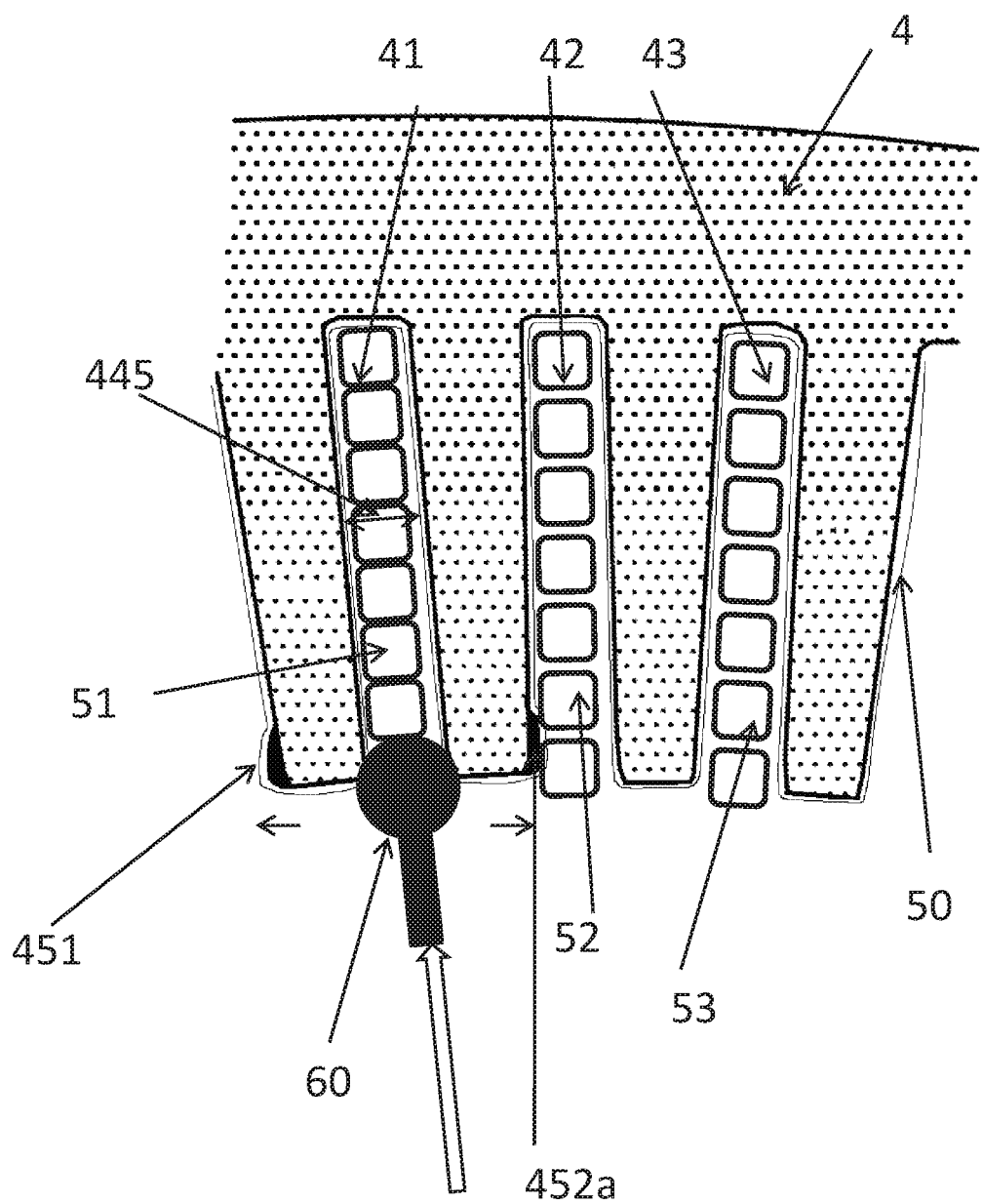

FIG. 7 illustrates the continuation of the displacement of the tool 60 in the direction of the notch opening of the notch 41. The continuation of this displacement involves compacting of the winding part 51 of the notch 41. Thus, the last wire no longer projects from the inner radial surface of the stator body. The continuation of the displacement also involves the formation of two notch closure elements 451 and 452a. The notch closure elements 451 and 452a are formed by the offsetting of some of the metal sheets of the notch 41 receiving the tool respectively to the left and to the right as illustrated in FIG. 7 by the two arrows. Thus, the notch closure elements 451 and 452a project in an orthoradial direction respectively within a notch which is not numbered and the notch 42. The offsetting of some of the metal sheets of the notch 41 receiving the tool 60 is carried out by deforming some of the metal sheets at the notch opening 49 of the notch 41 in the orthoradial direction by the radial displacement of the tool 60.

In other words, at least one of the notches is provided at the notch opening with at least one notch closure element, such that the winding part which is accommodated in the said notch is retained between the notch base and the notch closure element. The notch closure element is formed by offsetting of at least one of the metal sheets of an adjacent (i.e., consecutive) notch in the direction of the notch.

It will be appreciated that there could also be N tools 60 distributed axially on the notch 41. This would then give rise to the formation of 2 N closure elements distributed axially. There would also be better compacting of the winding part 51 of the notch 41, thanks to the radial supports distributed axially. For this purpose, it is possible to provide a single tool with the said N tools 60, in order to facilitate their manipulation.

Figure 8:
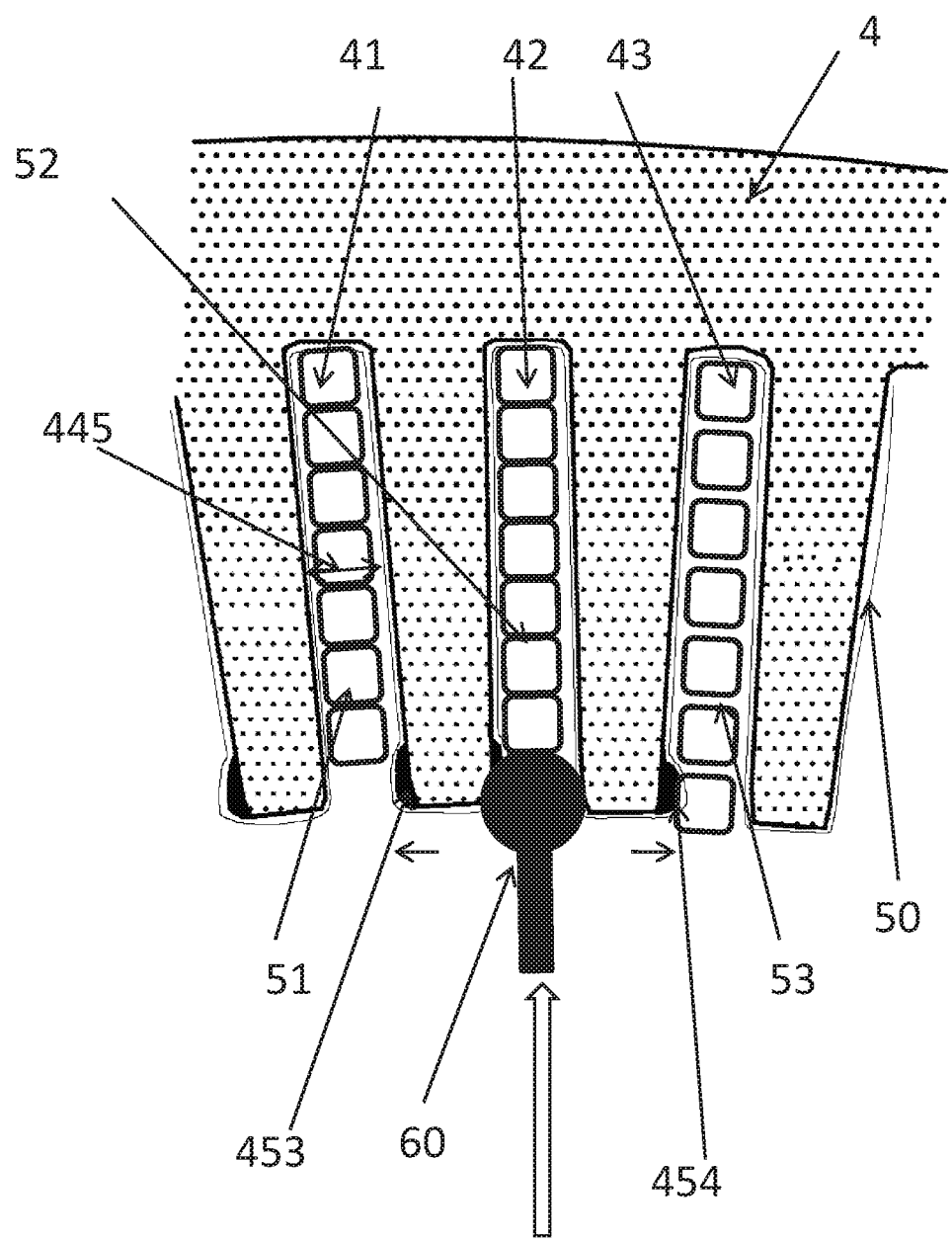

FIG. 8 illustrates the displacement of a tool 60 in the direction of the notch opening of the notch 42. According to a first embodiment, the tool 60 illustrated in FIG. 8 is the same as the one in FIG. 7. It is placed facing the notch 42 by means of a relative movement of rotation of the tool in relation to the stator. According to an example of this first embodiment, in order to go from the configuration in FIG. 7 to the one in FIG. 8, the tool 60 is retracted, the stator is turned, and the tool 60 is displaced in the direction of the notch 42. According to a second embodiment, the tool 60 is a tool in addition to the one illustrated in FIG. 7. it is different in that it is situated facing another notch, i.e. the notch 42, whereas the tool in FIG. 7 is facing the notch 41. According to an example of this second embodiment, the tool 60 in FIG. 7 is retracted, then the tool 60 in FIG. 8 is displaced in the direction of the notch 42.

According to the first or second embodiments, the offsetting is obtained of some of the metal sheets of the notch 42. The closure elements 453 and 454 are thus formed by this offsetting of the metal sheets of the notch 42 receiving the tool respectively to the left and to the right as illustrated in FIG. 8 by the two arrows. Thus, the closure elements 453 and 454 project in an orthoradial direction respectively within the notch 41 and the notch 43. According to these two embodiments, the displacement of the tool also involves compacting of the winding part 52 of the notch 42. Thus, the last wire no longer projects from the inner radial surface of the stator body.

In the case of the first embodiment, according to one embodiment the tool 60 retains the same axial position relative to the stator. This then provides closure elements

451, 452a, 453 and 454 which are situated on the same radial plane. According to another embodiment, it would be possible to carry out relative axial displacement of the tool 60 in relation to the stator 4. This relative axial displacement is carried out for example at the same time as the relative rotation of the stator 4 in relation to the tool 60. This then means that the closure elements 451, 452a are situated on a first radial plane, and the closure elements 453 and 454 are situated on a second radial plane, these first and second radial planes being different. For example, the first and second radial planes are situated at a distance greater than two metal sheets.

In the second embodiment, the tool 60 in FIG. 7 and the one in FIG. 8 can be situated on first and second substantially different radial planes. For example, the first radial plane and the second radial plane are spaced axially by a distance equal to at least two metal sheets. This then means that the closure elements 451, 452a are situated on the first radial plane, and the closure elements 453 and 454 are situated on the second radial plane, these first and second radial planes being different.

It will be appreciated that, as already stated for FIG. 7, N tools 60 could also be provided, distributed axially on the notch 42. They would then give rise to the formation of 2 N closure elements distributed axially. There would also be better compacting of the winding part 52 of the notch 42, thanks to the radial supports distributed axially. For this purpose, it is possible to provide a single tool of the said. N tools 60, in order to facilitate their manipulation.

Figure 9:
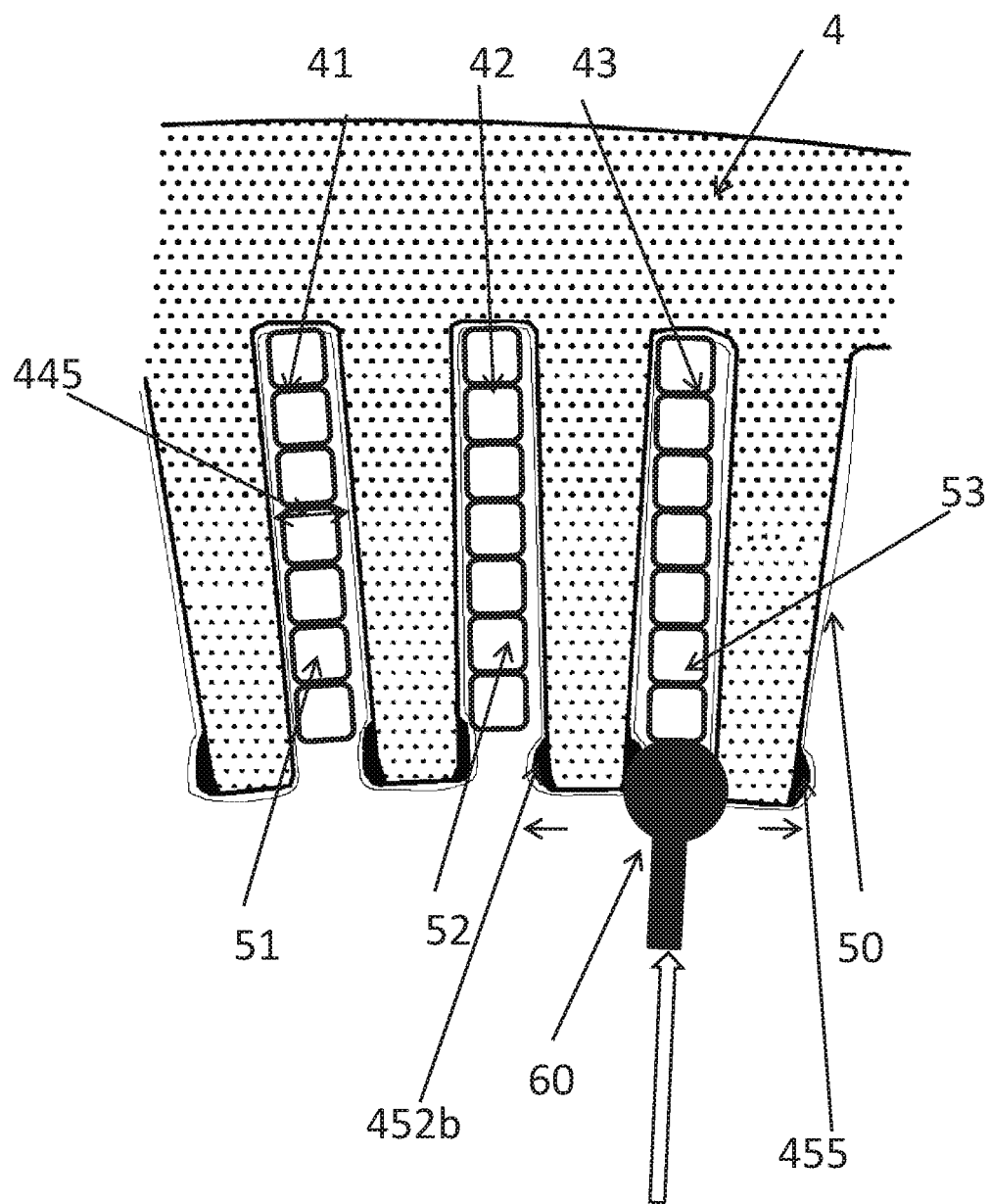

FIG. 9 illustrates the displacement of a tool 60 in the direction of the notch opening of the notch 43. As already stated, the tool 60 illustrated in FIG. 9 can be the same as the one in FIG. 8. It can also be different. It is also possible to provide a tool 60 which is not identical to the one facing the notch 42, but identical to the one facing the notch 41. This is then for example a notch closure method comprising two tools situated facing two consecutive notches during which, after a step of displacement towards the notch opening and a step of retraction of the two tools, the two tools are displaced in rotation by an angle corresponding to two notches relative to the stator.

The closure elements 452b and 455 formed by the tool 60 are in all cases on the plane of the tool 60 in FIG. 9.

It can be noted that the closure elements 453 and 452a on the one hand and 454 and 452b on the other hand are situated respectively on a single tooth 45. It thus appears that it can be advantageous for the closure elements 453 and 452a on the one hand to be on two different radial planes, and also for 454 and 452b to be on two different radial planes.

The fact of choosing to have the closure elements 453 and 452a on two different radial planes in fact makes it possible to prevent the formation of the closure element 453 by offsetting of the metal sheets to the left from interfering with the formation of the closure element 452a by offsetting of the metal sheets to the right.

Similarly, the fact of choosing to have the closure elements 454 and 452b on two different radial planes makes it possible to prevent the formation of the closure element 452b by offsetting of the metal sheets to the left from interfering with the formation of the closure element 454 by offsetting of the metal sheets to the right.

This phenomenon illustrated by way of example for the formation elements 453, 452a on the one hand, and 454 and 452b on the other hand is known as interference in the continuation of the description.

The dimensions of the tool 60 depend in particular on the size of the wire, the radial depth of the notch, the notch width, the insertion width, the width of the insulator and the number of wires per notch.

For example, with reference to FIGS. 7 and 9, there is a notch width of 1.95 mm, a wire size of approximately 1.56 mm, and an insulator with a thickness of 0.13 mm. This therefore provides an insertion width of 1.95−2×0.13=1.69, whereas the wire has a size of 1.56 mm. In addition, the radial depth of the notch is approximately 12.5 mm. Taking into account the fact that the notch base is covered with insulator, this therefore provides a depth for the winding part equal to 12.5−0.13=12.37 mm. The objective is to obtain compacting which is sufficient for at least the set of 7 conductors to be able to enter into this length of 12.37 mm. According to one embodiment, it can be defined that the radial gap between two wires is a maximum of 0.1 mm. It can be deduced that it is then necessary to have penetration of the tool 60 by a value as calculated as follows in the notch: 12.37−(7×1.56+6×0.1)=0.85 mm.

It is then necessary to define a tool form which, for this penetration value of 0.85 mm, permits offsetting of the metal sheets which is sufficient to allow wire to be retained in the adjacent notches. This necessary offsetting can be calculated according to the difference between the insertion width and the wire size. The value of the offsetting also depends on the presence of two offsettings facing one another in a single notch and on the same radial plane for the closure element. Specifically, the value of the offsetting must be greater if the closure element is formed solely by the offsetting to the right of the tooth between the notches 41 and 42, or by the offsetting to the left of the tooth between the notches 42 and 43. On the other hand, if the closure element is formed by the offsetting to the right of the tooth between the notches 41 and 42, and by offsetting to the left of the tooth between the notches 42 and 43, then the value of each of the two offsettings can be less great.

Thus, in the case when the closure element 452 is formed solely by the offsetting 452a or 452b, then it is necessary to have offsetting which compensates at least for the difference between the insertion width and the wire size, i.e.: 1.69−1.56=0.13 mm.

In the case when the closure element is formed by the offsetting 452a and the offsetting 452b, then it is sufficient to have offsetting which is two times less great, if it is assumed for example that the offsetting 452a is equal to the offsetting 452b, i.e. (1.69−1.56)/2=0.065.

There is thus a tool form which must permit offsetting of at least 0.13 mm or 0.065 mm on each of the two teeth, relative to the insertion width of 1.56 mm, for an introduction of 0.85 mm. In the case of a tool with a spherical form, this is possible with a sphere with a diameter of 4 mm.

In addition, three embodiments listed below can be cited by way of example:

Embodiment 1: the tool for the notches 41, 42 and 43 is identical. According to an example of this embodiment, if only one relative rotation of the stator takes place in relation to the tool, there are then the closure elements 451, 452a, 453, 454, 455 and 452b which are situated on the same radial plane. There is then in particular a single closure element 452 formed. by the two elements 452a and 452b.

Embodiment 2: the tools for the notches 42 and 43 are different. According to an example of this embodiment, there are then the closure elements 453 and 454 on the one hand, and 455 and 452b on the other hand, which are situated in sets of two, on two different radial planes.

Embodiment 3: the tool for the notches 41 and 43 is identical. According to an example of this embodiment, if there is only one relative rotation of the stator in relation to the tool, there are then the closure elements 451, 452*a*, 455 and 452*b* which are situated on the same radial plane, whereas the closure elements 453 and 454 are for example situated on another radial plane. This therefore prevents the aforementioned phenomenon of interference. Also, a single closure element 452 is obtained, formed by the two elements 452*a* and 452*b*.

As already stated for FIGS. 7 and 8, it will be appreciated that N tools 60 could also be provided, distributed axially on the notch 43, which would then give rise to the formation of a maximum of 2 N closure elements distributed axially. There would also be better compacting of the winding part 53 of the notch 43, thanks to the radial supports distributed axially.

Figure 10:
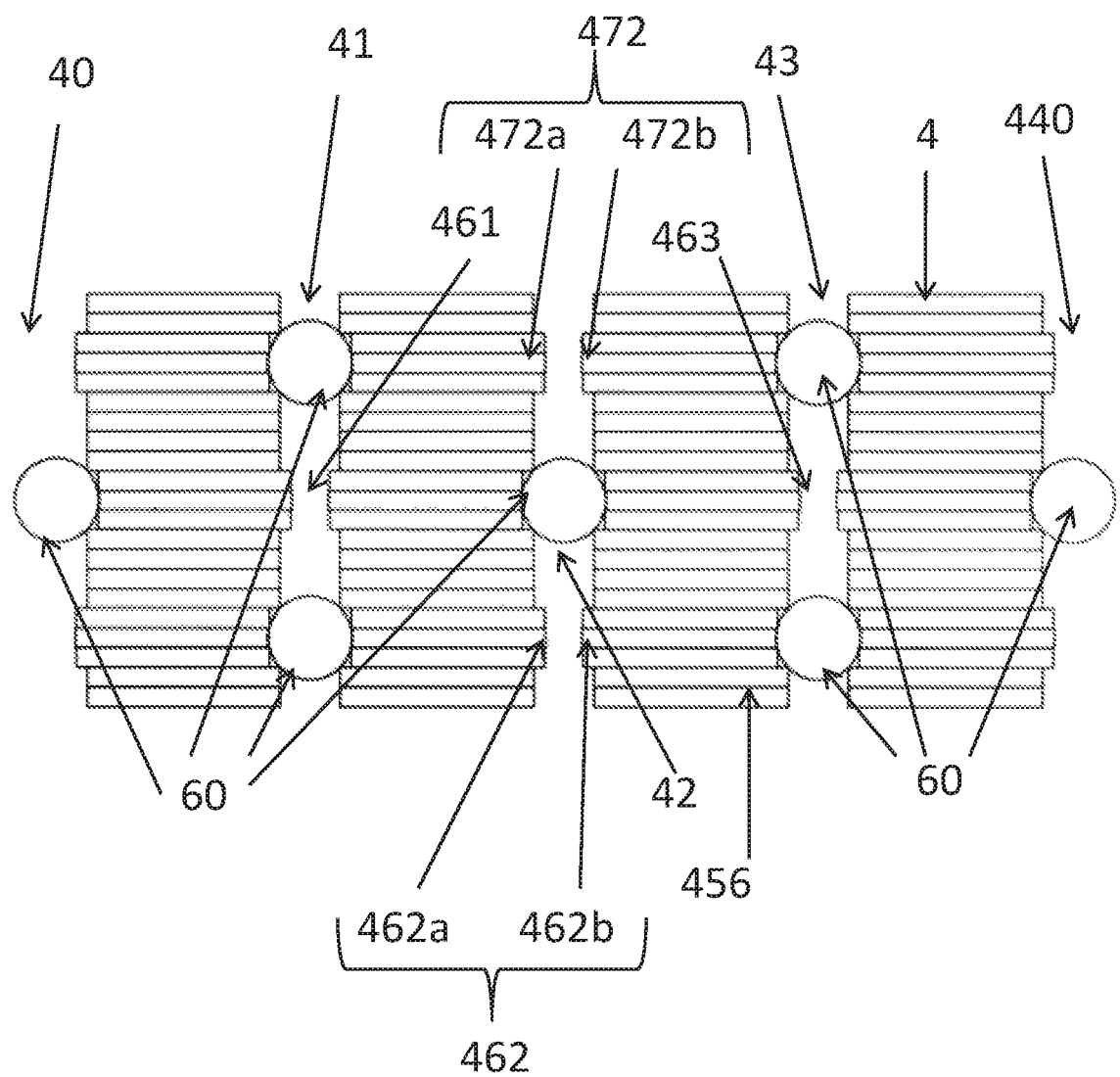
FIG. 10 is an internal view of the stator according to the invention.

FIG. 10 illustrates N=2 tools for the notches 41 and 43 and N=1 tool for the notch 42. More generally, according to FIG. 10, one out of two notches is deformed with one tool, and the remaining notches are deformed with two tools. There is also a notch deformed with one tool surrounded by two notches deformed with two tools.

In other words, one notch out of two comprises a number N of closure elements, N being a whole number equal to 2 or more, and the remaining notches comprise a smaller number of closure elements. For example, a number N of closure elements are adjacent to both sides of a notch with a number N−1 of closure elements. According to one example, with the notches being numbered according to the circumference of the stator, the notches with an even number comprise a number of closure elements different from that of the notches with an odd number.

As can be seen for the notch 42, the closure elements 472 and 462 are distributed axially along the axial length of the stator body. In addition, as can be seen for the notch 41 or 43 comprising N−1 closure elements, the closure element 461 or 463 is situated on a radial plane which passes via the middle of two adjacent closure elements of the notch 42.

It is found that for the notch 42 for example, the closure elements 462 and 472 of this notch are situated respectively on first radial planes of the stator body, and the closure elements 461 or 463 of the adjacent notch 41 or 43 are situated respectively on second radial planes of the stator body, the first radial planes being different from the second radial planes. For example, the first radial planes and the second radial planes are spaced axially by a distance equal to at least two metal sheets.

As can be seen for the notch 41 or 43, the closure element 461 or 463 is formed firstly by the offsetting of at least one of the metal sheets of an adjacent notch to the right in the direction of the said notch, and secondly offsetting of at least one of the metal sheets of an adjacent notch to the left in the direction of the said notch, the two offsettings being situated on the same radial plane. Similarly, for the notch 42, the two closure elements 472 and 462 are formed firstly by the offsetting of at least one of the metal sheets of an adjacent notch 43 to the right in the direction of the said notch, and secondly offsetting of at least one of the metal sheets of an adjacent notch 41 to the left in the direction of the said notch, the two offsettings being situated on the same radial plane.

For example, a closure element is formed by offsetting of at least two contiguous metal sheets, such that the closure element has an axial height of at least two metal sheets.

According to FIG. 10, for each closure element of a notch, at least one of the two adjacent notches has traces of deformation by radial introduction of a tool with an orthoradial dimension greater than the notch width. For example, for each closure element of the notch, at least one of the two adjacent notches has traces of deformation by radial introduction of a tool with a substantially spherical form.

According to one embodiment, the set of two tools of the notch 41 and the set of two tools of the notch 43 are identical. For this purpose, it is possible to provide a single tool for the set of two tools 60 which deforms the notches 41 and 43.

According to an example of this embodiment, it is possible to carry out only one relative rotation by an angle corresponding to two notches of the stator in relation to the tool, in order to go from the notch 41 to the notch 43. In particular, for the notch 42, there is then a closure element 472*a* or 462*a* obtained from the deformation of the notch 41 on the same radial plane as a closure element 472*b* or 462*b* obtained from the deformation of the notch 43. In other words, the first set of closure elements 472*a* and 472*b*, and the second set of closure elements 462*a* and 462*b* are each on a radial plane, and each of these two sets thus forms a single closure element 462 or 472.

According to an example of this embodiment, the closure elements 461 and 463 formed by the deformation of the notch 42 can be situated on radial planes other than those of the closure elements 462 and 472 of the notch 42. This therefore prevents the aforementioned phenomenon of interference.

According to one embodiment, the tool 60 which deforms the notches 40, 42 and 44 can be identical, and can act on the various aforementioned notches by rotation by an angle corresponding to two notches. In this case, the closure elements (in particular 461, 463) formed by the deformation of the notches 40, 42 and 44 can be situated on the same radial plane, which is different from the radial planes of the closure elements obtained from the deformation of the notch 41 or the notch 43. This therefore also prevents the aforementioned phenomenon of interference.

More generally, the cases described hereinafter by way of example do not depart from the context of the invention.

Case 1 (not illustrated in FIG. 10): the sets of N tools which act on the successive notches are the same set. According to an example of this embodiment, if there is only one relative rotation of the stator in relation to the tool, there is then a number of radial planes comprising at least one closure element equal to N, and each of the radial planes comprises the same number of closure elements.

Case 2: the set of tools acting on the notch 42 is different from the one which acts on the notch 43. According to an example of this second case, the closure elements 462 and 463 obtained from the deformation of the notch 42 are situated on planes different from those of the closure elements 472*b* and 462*b* obtained from the deformation of the notch 43. In other words, for a tooth with the reference 456 in FIG. 10, the offsettings of the metal sheets to the left 472*b* and 462*b* caused by the deformation of the notch 43, and the offsettings of the metal sheets to the right 472*a* and 462*a* caused by the deformation of the notch 42, will never be situated on the radial plane, and this therefore prevents the aforementioned phenomenon of interference.

Case 3: the sets of N tools acting on the notches 41 and 43 are the same set. According to an example of this case, if there is only one relative rotation of the stator in relation to the set of N tools, there is then in particular for the notch 42 for the closure elements 472*a* and 462*a*, obtained from the deformation of the notch 41, a closure element 467*a* or 462*b*, obtained from the deformation of the notch 43, which is on the same radial plane. The two closure elements on the same radial plane obtained respectively from the deformation of the notch 41 and the deformation of the notch 43 form a single closure element 462 or 472. According to one example, this case 3 can be combined with the case 2 of this embodiment, and this therefore prevents the aforementioned phenomenon of interference for the tooth 456 in particular.

Figure 11:
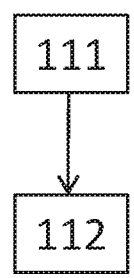
FIG. 11 is a schematic view of the steps of the method according to the invention.

FIG. 11 illustrates a method for production of a stator of a rotary electrical machine as illustrated above. The method comprises a closure step 111 which comprises a step of offsetting of at least one of the metal sheets of an adjacent notch in the direction of the said notch.

For example, the offsetting step is carried out on an axial height of at least two metal sheets. As has been illustrated above, the offsetting step comprises a step of introduction of a tool according to a radial direction, the said tool having an orthoradial dimension greater than the notch width.

In addition, the method also comprises a step 112 of compacting of the winding part accommodated in the notch into which the tool is introduced according to a radial direction. According to one embodiment, this compacting is carried out during the said offsetting step.

The invention claimed is:

1. A method for making a stator (6) of a rotary electrical machine (1), comprising the steps of:
    forming a stator body (4) from a stack of geometrically identical metal sheets, the stator body (4) having an axis (X) and provided with notches (44, 41, 42, 43) extending both radially and axially and separated by teeth (45), the stator body (4) delimited by an inner radial surface and an outer radial surface, each of the notches (44, 41, 42, 43) having a notch base (48) and a notch opening (49), the notch opening (49) being situated on a side of the inner radial surface of the stator body (4);
    providing a stator winding (5) comprising a plurality of winding parts (51, 52, 53);
    mounting the stator winding (5) to the stator body (4) so that each of the winding parts (51, 52, 53) is accommodated in one of the notches; and
    forming at least one notch closure element (451, 452a, 452b, 453, 454) of each of the notches (44, 41, 42, 43) at the notch opening of each of the notches (44, 41, 42, 43) by circumferential offsetting at least one but not all of the metal sheets at the notch opening of the other of the notches in an orthoradial direction, one of the notches being consecutive to other of the notches;
    the at least one notch closure element retaining one of the winding parts in the one of the notches between the notch base and the at least one notch closure element
    wherein the step of forming the at least one notch closure element of one of the notches is carried out by radial introduction of a tool (60) into the notch opening of the other of the notches,
    wherein the one of the notches is consecutive to the other of the notches, and wherein the tool (60) has a spherical form.

2. The method according to claim 1, wherein one notch out of each of two consecutive notches of the notches (44, 41, 42, 43) of the stator body (4) comprises a number N of the notch closure elements, wherein N is a whole number equal to 2 or more, and wherein another notch out of each of the two consecutive notches of the notches (44, 41, 42, 43) of the stator body (4) comprises a number of the notch closure elements smaller than N.

3. The method according to claim 2, wherein two of the notches with the number N of the notch closure elements are adjacent to both sides of the notch with the number of the notch closure elements smaller than N.

4. The method according to claim 3, wherein with the notches being numbered according to a circumference of the stator, the notches with an even number comprise a number of the notch closure elements different from that of the notches with an odd number.

5. The method according to claim 3, wherein the notch closure elements of the notches (42) are distributed axially along an axial length of the stator body.

6. The method according to claim 2, wherein with the notches being numbered according to a circumference of the stator, the notches with an even number comprise a number of the notch closure elements different from that of the notches with an odd number.

7. The method according to claim 2, wherein the notch closure elements of the notches (42) are distributed axially along an axial length of the stator body.

8. The method according to claim 1, wherein with the notches being numbered according to a circumference of the stator, and wherein the notches with an even number comprise a number of the notch closure elements different from that of the notches with an odd number.

9. The method according to claim 8, wherein the notch closure elements of the notches (42) are formed so as to be distributed axially along an axial length of the stator body.

10. The method according to claim 1, wherein the notch closure elements of the notches (42) are formed so as to be distributed axially along an axial length of the stator body.

11. The method according to claim 10, wherein at least one of the notch closure elements of one of the notches (41, 43) with a smaller number of the notch closure elements is situated on a radial plane which passes via a middle of two adjacent notch closure elements of the notch (42) comprising the N notch closure elements.

12. The method according to claim 1, wherein, for at least one notch (42) of the notches (44, 41, 42, 43), with the at least one notch closure element of the at least one notch (42) situated respectively on first radial planes of the stator body, and the at least one notch closure element of the adjacent notch (41, 43) being situated respectively on second radial planes of the stator body, the first radial planes are different from the second radial planes.

13. The method according to claim 12, wherein the first radial planes and the second radial planes are spaced axially by a distance equal to at least two metal sheets.

14. The method according to claim 1, wherein one of the notch closure elements (452a) is formed by deforming at least one of the metal sheets of one of the adjacent notches to the right in the orthogonal direction toward the notch, wherein another notch closure element (452b) is formed by deforming the at least one of the metal sheets of another adjacent notch to the left in the orthogonal direction toward the notch, and wherein the two notch closure elements (452a, 452b) are formed so as to be situated in the same radial plane.

15. The method according to claim 1, wherein the at least one notch closure element (451, 452, 453, 454) is formed by deforming at least two contiguous metal sheets, such that the at least one notch closure element has an axial height of at least two metal sheets.

16. The method according to claim 1, wherein one of the winding parts (51, 52, 53) of one of the notches comprises a plurality of wires aligned according to a column.

17. A method for making a stator (6) of a rotary electrical machine (1), comprising steps of:
- forming a stator body (4) from a stack of geometrically identical metal sheets, the stator body (4) having an axis (X) and provided with notches (44, 41, 42, 43) extending both radially and axially and separated by teeth (45), the stator body (4) delimited by an inner radial surface and an outer radial surface, each of the notches (44, 41, 42, 43) having a notch base (48) and a notch opening (49), the notch opening (49) being situated on a side of the inner radial surface of the stator body (4);
- providing a stator winding (5) comprising a plurality of winding parts (51, 52, 53);
- mounting the stator winding (5) to the stator body (4) so that each of the winding parts (51, 52, 53) is accommodated in one of the notches; and
- forming at least one notch closure element (451, 452a, 452b, 453, 454) of each of the notches (44, 41, 42, 43) at the notch opening of each of the notches (44, 41, 42, 43) by circumferential offsetting at least one but not all of the metal sheets at the notch opening of the other of the notches in an orthoradial direction, one of the notches being consecutive to other of the notches;
- the at least one notch closure element retaining one of the winding parts in the one of the notches between the notch base and the at least one notch closure element;
- the step of forming the at least one notch closure element of one of the notches is carried out by radial introduction of a tool (60) into the notch opening of the other of the notches, wherein the one of the notches is consecutive to the other of the notches, and wherein an orthoradial dimension of the tool (60) is greater than a width of the one of the notches.

18. The method according to claim 17, wherein, for the at least one notch closure element formed for one of the notches (42), at least one of the two adjacent notches has traces of deformation formed by compacting from the radial introduction of the tool (60).

19. The method according to claim 17, wherein one of the winding parts (51, 52, 53) of one of the notches has traces of compacting by the radial introduction of the tool (60).

* * * * *